(12) United States Patent
Gurreri et al.

(10) Patent No.: US 10,156,682 B2
(45) Date of Patent: Dec. 18, 2018

(54) HYBRID CONNECTION SYSTEM USING FACTORY CONNECTORIZED PIGTAIL

(71) Applicant: CommScope Technologies LLC, Hickory, NC (US)

(72) Inventors: Michael Lawrence Gurreri, York, PA (US); Robert Charles Flaig, Lancaster, PA (US); Dwight A. Bretz, Hummelstown, PA (US); Eric Ryan Chappell, Statesville, NC (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 15/546,556

(22) PCT Filed: Jan. 26, 2016

(86) PCT No.: PCT/US2016/014958
§ 371 (c)(1),
(2) Date: Jul. 26, 2017

(87) PCT Pub. No.: WO2016/123127
PCT Pub. Date: Aug. 4, 2016

(65) Prior Publication Data
US 2018/0011257 A1 Jan. 11, 2018

Related U.S. Application Data

(60) Provisional application No. 62/107,879, filed on Jan. 26, 2015.

(51) Int. Cl.
*G02B 6/38* (2006.01)
*H01R 4/02* (2006.01)
(Continued)

(52) U.S. Cl.
CPC ......... *G02B 6/3817* (2013.01); *G02B 6/3846* (2013.01); *G02B 6/3885* (2013.01);
(Continued)

(58) Field of Classification Search
CPC .. G02B 6/3817; G02B 6/4293; G02B 6/3846; G02B 6/3885; G02B 6/4285;
(Continued)

(56) References Cited

U.S. PATENT DOCUMENTS 6,062,895 A * 5/2000 Lin ..................... H01R 4/2429
439/404
7,253,362 B1 * 8/2007 Dower .................... H01R 4/70
174/84 R
(Continued)

FOREIGN PATENT DOCUMENTS

JP 08-304675 A 11/1996
WO 2012/038104 A1 3/2012

OTHER PUBLICATIONS

International Search Report and Written Opinion of the International Searching Authority for corresponding International Patent Application No. PCT/US2016/014958 dated May 23, 2016, 10 pages.

(Continued)

*Primary Examiner* — Ryan Lepisto
(74) *Attorney, Agent, or Firm* — Merchant & Gould P.C.

(57) ABSTRACT

A hybrid optical and electrical connection system includes a connectorized pigtail and a closure. The connectorized pigtail includes: a) a stub cable including a jacket containing at least one optical fiber and at least two electrical conductors, the stub cable having opposite first and second ends; and b) a hybrid optical and electrical connector that is factory terminated at the first end of the stub cable. The closure mounts at the second end of the stub cable for enclosing
(Continued)

optical and electrical connections between the second end of the stub cable and a field cable.

27 Claims, 4 Drawing Sheets

(51) Int. Cl.
    *H01R 24/20*     (2011.01)
    *G02B 6/42*     (2006.01)
    *H01R 4/24*     (2018.01)
    *H01R 13/502*     (2006.01)
    *H01R 13/52*     (2006.01)
    *H01R 13/625*     (2006.01)
    *H01R 24/28*     (2011.01)

(52) U.S. Cl.
    CPC .......... *G02B 6/4285* (2013.01); *G02B 6/4293* (2013.01); *H01R 4/021* (2013.01); *H01R 4/24* (2013.01); *H01R 13/502* (2013.01); *H01R 13/5205* (2013.01); *H01R 13/5216* (2013.01); *H01R 13/5221* (2013.01); *H01R 13/625* (2013.01); *H01R 24/20* (2013.01); *H01R 24/28* (2013.01)

(58) Field of Classification Search
    CPC .. H01R 13/502; H01R 13/5221; H01R 24/28; H01R 4/24; H01R 4/021; H01R 13/5216; H01R 13/5205; H01R 13/625; H01R 24/20
    See application file for complete search history.

(56) References Cited

U.S. PATENT DOCUMENTS

| | | | |
|---|---|---|---|
| 8,475,055 B2* | 7/2013 | Ciechomski | G02B 6/4475 385/101 |
| 2006/0056769 A1 | 3/2006 | Khemakhem et al. | |
| 2009/0022460 A1 | 1/2009 | Lu et al. | |
| 2012/0039571 A1 | 2/2012 | Ciechomski et al. | |
| 2012/0177328 A1 | 7/2012 | Marcouiller et al. | |
| 2013/0146355 A1* | 6/2013 | Strasser | G02B 6/4471 174/72 A |
| 2013/0287348 A1 | 10/2013 | Register, III et al. | |

OTHER PUBLICATIONS

Extended European Search Report for corresponding European Patent Application No. 16743977.7 dated Jul. 26, 2018, 7 pages.

\* cited by examiner

HYBRID CONNECTION SYSTEM USING FACTORY CONNECTORIZED PIGTAIL

CROSS-REFERENCE TO RELATED APPLICATION

This application is a National Stage Application of PCT/US2016/014958, filed on Jan. 26, 2016, which claims the benefit of U.S. Patent Application Ser. No. 62/107,879, filed on Jan. 26, 2015, the disclosures of which are incorporated herein by reference in their entireties. To the extent appropriate, a claim of priority is made to each of the above disclosed applications.

TECHNICAL FIELD

The present disclosure relates generally to connection systems for telecommunications networks. Particularly, the present disclosure relates to connection systems capable of accommodating both optical signals and electrical power.

BACKGROUND

In today's telecommunications market there is growing demand to support active devices such as fixed location transceivers for generating wireless communication coverage areas (e.g., Wi-Fi access points, macrocells, microcells, picocells, femtocells, other cell sizes, wireless hot spots, nodes, etc.), power-over-Ethernet extenders, and IP devices (e.g., digital cameras such as security cameras, computing devices, etc.). There is also desire to support such devices with faster transmission rates, higher power and longer spans. To achieve faster transmission rates, it is desirable to support such active devices using an optical fiber network. However, traditional fiber optic networks are generally passive (e.g., passive optical local area networks (POLAN), fiber-to-the-home (FTTH), fiber-to-the-desk (FTTD), fiber-to-the-node (FTTN), fiber-to-the-curb (FTTC) and other network architectures) and therefore do not provide ready access to power. Thus, there is a need to support active devices with both electrical power and optical signals in a cost-effective manner. There is also a need to integrate hybrid connectivity (e.g., both power and fiber optics) into existing fiber optic networks.

SUMMARY

One aspect of the present disclosure relates to a hybrid connection system capable of providing connectivity for both fiber optics and electrical power. In one example, the hybrid connection system includes a splice-on pigtail capable of transmitting both electrical power and optical signals. In certain examples, the splice-on pigtail is connected to another cable in the field through the use of a closure for enclosing optical and electrical connections. In certain examples, one or more optical splices can be provided within the closure. In certain examples, electrical terminals can be provided within the closure for making electrical connections therein. In certain examples, the electrical terminals can include insulation displacement connectors. In certain examples of the present disclosure, the closure can be sealed with a gel or other material. In certain examples of the present disclosure, the pigtail can include a stub cable including a jacket containing at least one optical fiber and at least two electrical conductors, and a hybrid optical and electrical connector that is factory terminated at one end of the stub cable. In certain examples, the stub cable is relatively short. For example, the stub cable can be less than 50 centimeters in length, or less than 40 centimeters in length, or less than 30 centimeters in length. In certain examples, the closure is relatively small. For example, the closure can have a length that is less than 10 centimeters in certain examples.

A further aspect of the present disclosure relates to a hybrid pigtail that can be readily installed in the field by a splicing operation or other field termination technique.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

DETAILED DESCRIPTION

Figure 1:
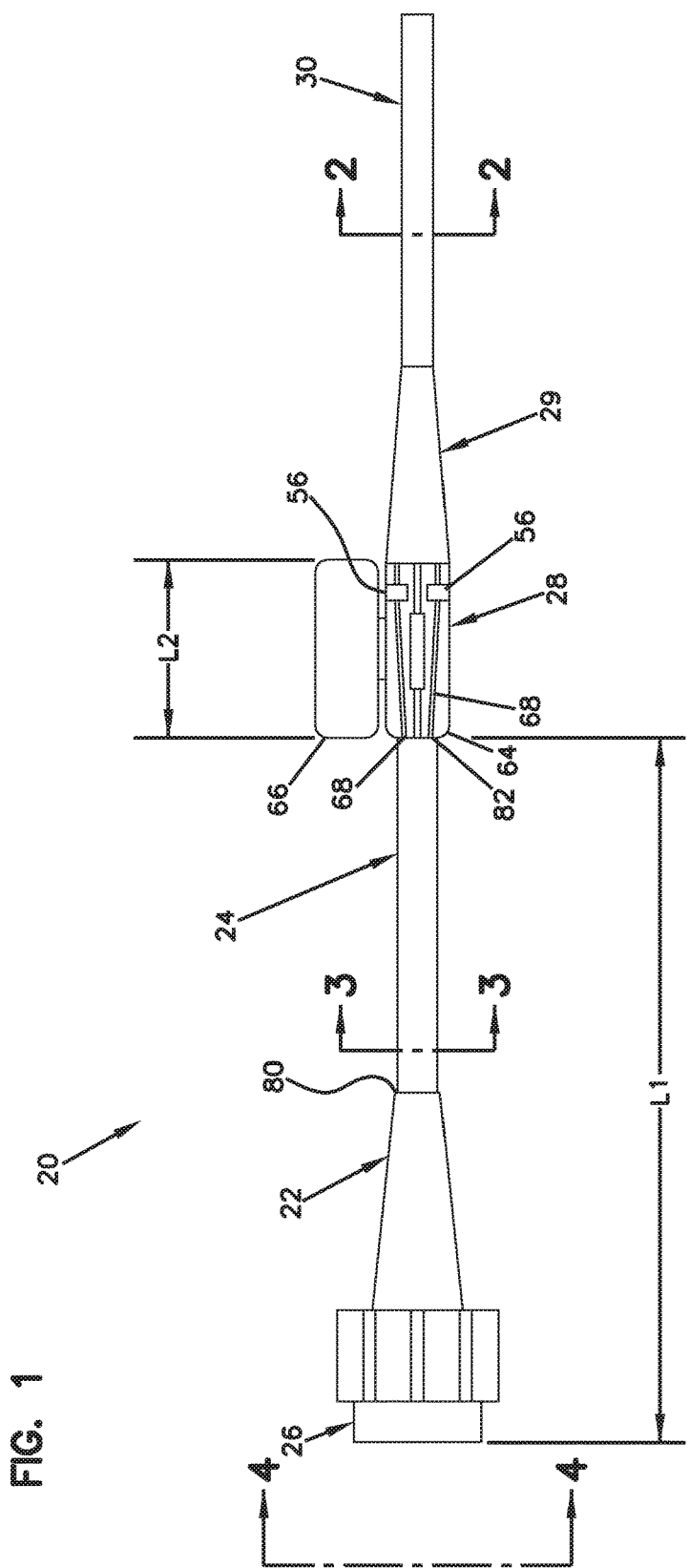
FIG. 1 illustrates a hybrid pigtail connection system in accordance with the principles of the present disclosure.

FIG. 1 illustrates a hybrid optical and electrical connection system 20 in accordance with the principles of the present disclosure. Generally, the hybrid optical and electrical connection system 20 includes a connectorized pigtail 22 having a hybrid stub cable 24 factory terminated by a hybrid connector 26. The hybrid optical and electrical connection system also includes a closure 28 for enclosing and protecting optical and electrical connections between the hybrid stub cable 24 and a hybrid field cable 30.

In certain examples, the connectorized pigtail 22 is relatively short in length. For example, the connectorized pigtail 22 can have a length L1 that is less than 50 centimeters, or less than 40 centimeters, but less than 30 centimeters.

Figure 2A:
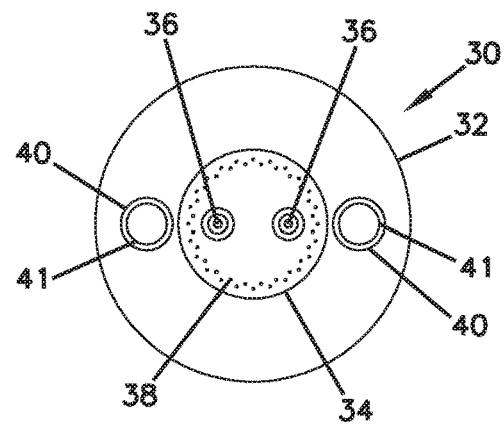
FIG. 2A is a cross-sectional view taken along section line 2-2 of FIG. 1 showing a first example style of field cable that can be coupled to the hybrid pigtail.

FIG. 2A shows an example configuration for the hybrid field cable 30. As shown at FIG. 2A, the hybrid field cable 30 includes a jacket 32 defining a central passage 34 containing one or more optical fibers 36. The jacket 32 is depicted having a round transverse cross-sectional shape/profile. In certain examples, optical fibers 36 can each include a core surrounded by a cladding layer which is protected by a coating layer. In certain examples, the optical fibers 36 can be protected by loose or tight buffer layers. In still other examples, the plurality of optical fibers 36 can be positioned within a central buffer tube of the hybrid field cable 32. In the embodiment of FIG. 2A, the optical fibers 36 include two optical fibers, but more than two can be provided.

Still referring to FIG. 2A, the hybrid field cable 30 can also include tensile reinforcing members 38 for providing tensile strength to the hybrid field cable 30. In certain examples, the tensile reinforcing members 38 can be positioned within the passage 34. In other examples, the tensile reinforcing members 38 can be imbedded within the jacket 32 or positioned within further passages defined within the jacket 32. By way of example, the tensile reinforcing members 38 can include strands of Aramid yarn. In other examples, the tensile reinforcing members 38 can include other reinforcing materials such as S-Glass, E-Glass and/or structures such as fiberglass reinforced epoxy rods. The hybrid field cable 30 can also include electrical conductors 40 such as solid metal conductors (e.g., copper) or braided metal conductors (e.g., copper). In certain examples, electrical conductors 40 can each be surrounded by an insulation layer 41.

Figure 2B:
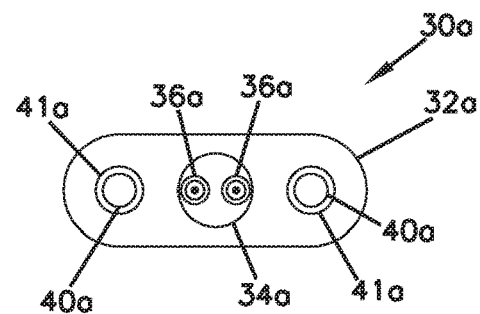
FIG. 2B is a cross-sectional view taken along section line 2-2 of FIG. 1 showing a second example style of field cable that can be coupled to the hybrid pigtail.

FIG. 2B shows another hybrid field cable 30a suitable for use with the connectorized pigtail 22. The hybrid field cable 30a includes a jacket 32a having an elongated, flat transverse cross-sectional profile. The jacket 32a defines a passage 34a containing a plurality of optical fibers 36a. Tensile reinforcing members can be provided within the passage 34a or embedded/positioned elsewhere in the jacket 32a. The hybrid field cable 30a also includes electrical conductors 40a. The electrical conductors 40a can each be encased within an insulation layer 41a.

Figure 3:
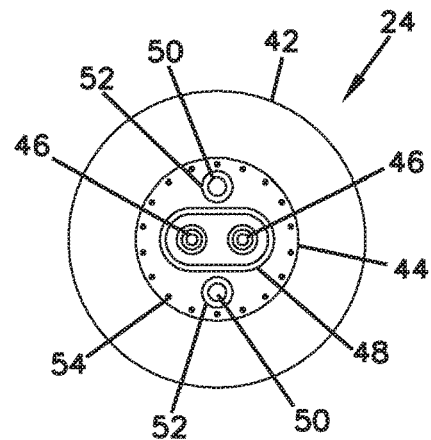
FIG. 3 is a cross-sectional view taken along section line 3-3 of FIG. 1 showing an example configuration for a stub cable of the hybrid pigtail.

Referring to FIG. 3, an example configuration for the hybrid stub cable 24 is depicted. The hybrid stub cable 24 includes a jacket 42 defining a passage 44. One or more optical fibers 46 are provided within the passage 44. The optical fibers 46 can each include a core, a cladding layer surrounding the core and a coating layer surrounding the cladding layer. In certain examples, the optical fibers 46 can be positioned within protective buffer layers such as loose or tight buffer tubes. In certain examples, a buffer tube in the form of a single core tube 48 can contain and protect the optical fibers 46.

Still referring to FIG. 3, the stub cable 24 also includes electrical conductors 50 positioned within the passage 44. In certain examples, the electrical conductors 50 can have a construction that includes solid or stranded metal such as solid or stranded copper. In certain examples, electrical conductors 50 can be each protected by a separate insulation layer 52. In certain examples, the electrical conductors 50 can be sized to accommodate 12 AWG applications or 16 AWG applications.

Still referring to FIG. 3, the stub cable 24 can also include tensile reinforcing members 54 positioned within the passage 44 or embedded/positioned elsewhere in the jacket 42. The tensile reinforcing members 54 can include strands of reinforcing elements such as strands of Aramid yarn, fiberglass yarns or other types of reinforcing members.

Figure 5:
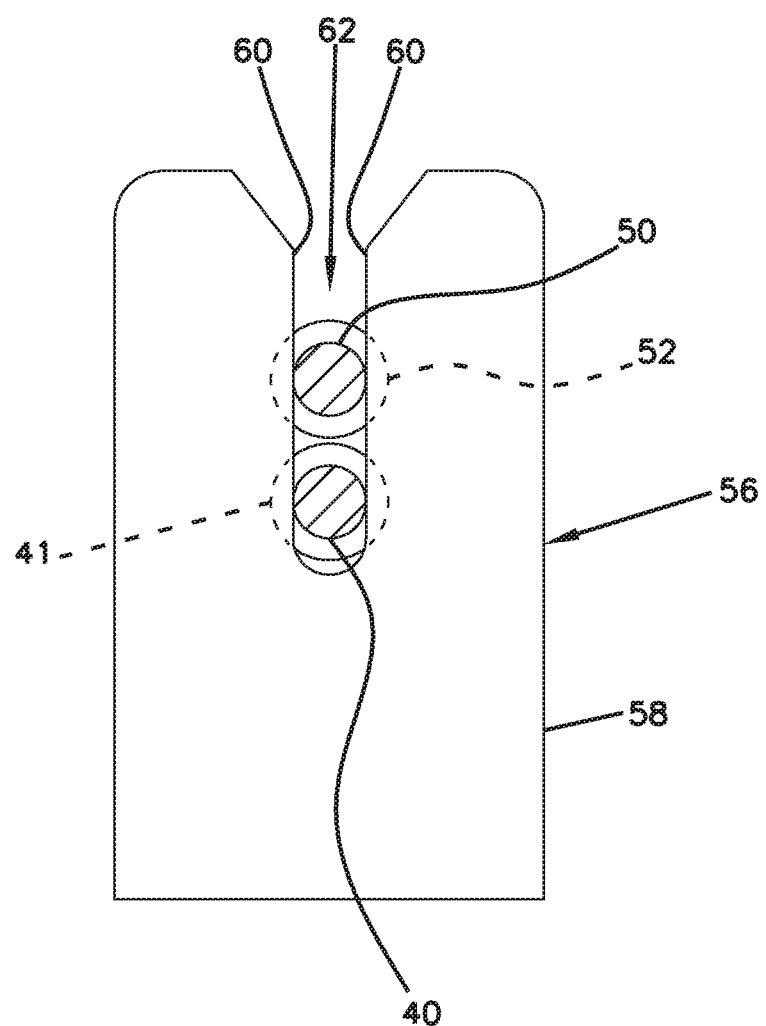
FIG. 5 illustrates an insulation displacement connector that can be incorporated into the closure of the hybrid connectorization system of FIG. 1.

In certain examples, the hybrid connector 26 can be factory terminated to the hybrid stub cable 24, and the connectorized pigtail 22 can be field terminated to the hybrid field cable 30. The closure 28 can be configured to assist in field terminating the connectorized pigtail 22 to the field cable 30. In certain examples, closure 28 can be configured to house and protect splices between the optical fibers 36 of the hybrid field cable 30 and the optical fibers 46 of the stub cable 24. In certain examples, the optical splices can be fusion splices or mechanical splices. In certain examples, the closure 28 can also house and protect connections between the electrical conductors 40 of the hybrid field cable 30 and the electrical conductors 50 of the hybrid stub cable 24. In certain examples, electrical termination structures can be provided within the closure 28. For example, the closure 28 can include electrical connectors such as insulation displacement connectors 56 suitable for electrically connecting the electrical conductors 40 of the hybrid field cable 30 to the electrical conductors 50 of the stub cable 24. Referring to FIG. 5, a typical insulation displacement connector 56 includes a contact 58 having opposing blades 60 that define a slot 62. When the electrical conductors 40, 50 are inserted into the slot 62, the blades 60 cut through the insulation surrounding the electrical conductors 40, 50 and embed into the electrical conductors 50, 40 thereby making an electrical connection between the electrical conductors 40, 50.

In certain examples, the closure 28 is relatively small in size. For example, closure 28 can have a length L2 that is less than or equal to about 10 centimeters. Additionally, the closure 28 can be configured to provide easy access to the interior of the enclosure 28. For example, closure 28 can include a main body 64 and a cover 66. The cover 66 can be connected to the main body 64 by a hinge. By pivoting the cover 66 to an open position relative to the main body 64, an interior of the closure 28 can readily be accessed. In certain examples, the closure 28 is sealed when closed. For example, the closure 28 can include a sealing arrangement such as a gel seal 68 that environmentally seals the closure 28 when the closure 28 is closed.

In certain examples, the tensile reinforcing members 38 of the hybrid field cable 30 and the tensile reinforcing members 54 of the stub cable 24 can be anchored to the closure 28. For example, the closure 28 can include one or more passages for receiving the tensile reinforcing members 38, 54. Adhesive or other structure can be used to anchor the tensile reinforcing members 38, 54 to the closure 28. In other examples, the tensile reinforcing members 38, 54 can be mechanically anchored to the closure 28 by means such as crimp sleeves, fasteners or other types of mechanical securement techniques.

Referring back to FIG. 1, a tapered, flexible boot 29 can be provided at a juncture between the closure 28 and the hybrid field cable 30. The tapered, flexible boot 29 can be configured to provide bend radius action to the hybrid field cable 30 at the juncture location.

In certain examples, the closure 28 can have features that allow the closure 28 to interface with other network elements. For example, the closure 28 can have a configuration adapted to fit into a corresponding holder.

The hybrid stub cable 24 includes a first end 80 and an opposite second end 82. The hybrid connector 26 is preferably factory terminated to the first end 80 of the hybrid stub cable 24. The second end 82 of the hybrid stub cable 24 is preferably field terminated to the hybrid field cable 30 with the assistance of the closure 28.

Figure 4A:
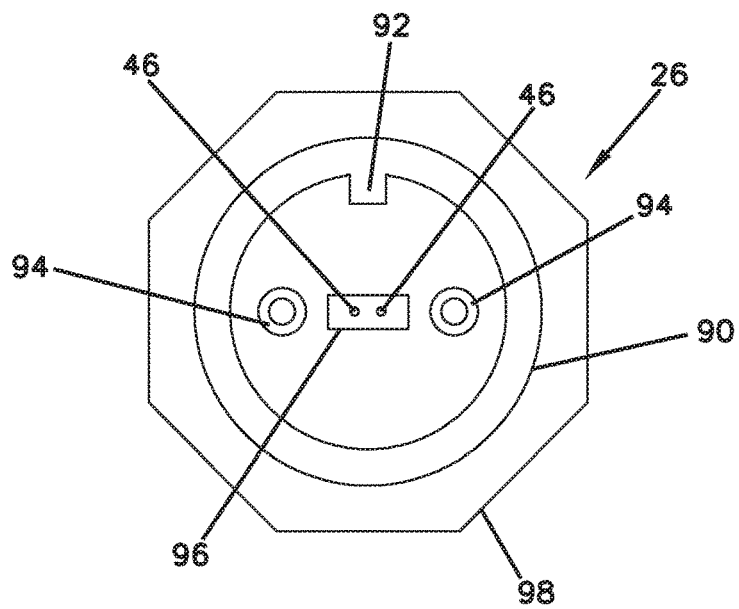
FIG. 4A is a view taken along section line 4-4 of FIG. 1 showing an interface end of an example hybrid connector that can be used with the hybrid pigtail of FIG. 1.

Referring to FIG. 4A, the hybrid connector 26 can include a connector body 90 including a key 92 for establishing a desired rotational orientation between the connector body 90 and a mating connector or adapter. In certain examples, electrical contacts 94 (e.g., pins or sockets) are housed within and/or supported by the connector body 90. The electrical contacts 94 are electrically connected to the electrical conductors 50 of the hybrid stub cable 24 and are adapted to electrically connect to corresponding electrical contacts of the connector or adapter that mates with the connector body 90. The hybrid connector 26 also includes a ferrule such as a multi-fiber ferrule 96 that supports ends of the optical fibers 46 of the hybrid stub cable 24. When the hybrid connector 26 is mated with a corresponding connector or adapter, the optical fibers supported by the multi-fiber ferrule 96 are optically connected to corresponding optical fibers of the mating connector\adapter.

The hybrid connector 26 can also include a fastening element 98 for securing the hybrid connector 26 to the mating adapter or connector. In certain examples, the fastening element 98 can include a twist-to-lock fastening element such as an internally threaded sleeve, and externally threaded nut or a bayonet-style coupling element. In certain examples, the hybrid connector 26 can be environmentally sealed when coupled to the mating connector or adapter.

Figure 4B:
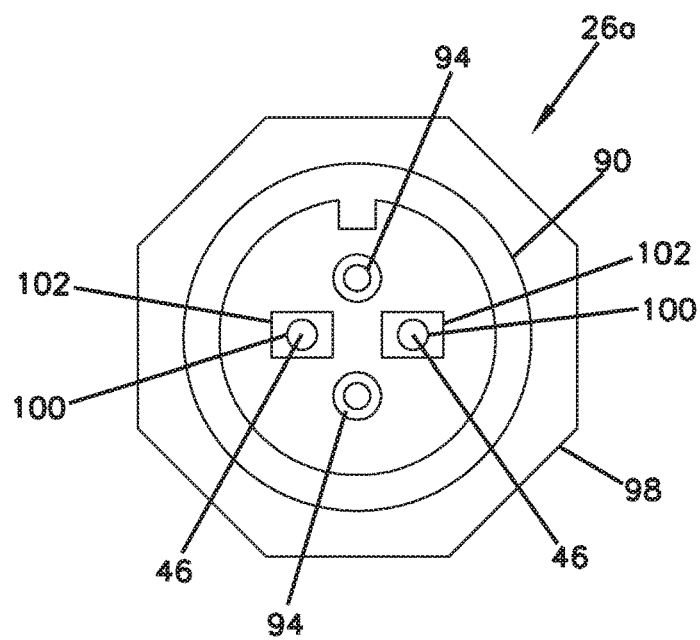
FIG. 4B is a view taken along section line 4-4 of FIG. 1 showing the interface end of another example hybrid connector that can be used with the hybrid pigtail of FIG. 1.

FIG. 4B shows an alternative hybrid connector 26a that can be utilized with the connectorized pigtail 22. The hybrid connector 26a has the same general components as the hybrid connector 26 except the end portions of the optical fibers 46 are supported by separate ferrules 100. In certain examples, the separate ferrules 100 can be supported by separate connector bodies 102. In certain examples, the connector bodies can be LC or SC connector bodies. In certain examples, an LC-duplex spacing can be provided between the separate ferrules.

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:

1. A hybrid optical and electrical connection system comprising;
   a connectorized pigtail including:
     a) a stub cable including a jacket containing at least one optical fiber and at least two electrical conductors, the stub cable having opposite first and second ends; and
     b) a hybrid optical and electrical connector that is factory terminated at the first end of the stub cable; and
   a closure that mounts at the second end of the stub cable for enclosing optical and electrical connections between the second end of the stub cable and a field cable;
   wherein the closure is a field installable closure having first and second housing pieces configured to be field installed over the optical and electrical connections after the optical and electrical connections have been made by wrapping the first and second housing pieces around the optical and electrical connections.

2. The hybrid optical and electrical connection system of claim 1, wherein the connectorized pigtail has a length less than 50 centimeters.

3. The hybrid optical and electrical connection system of claim 1, wherein the connectorized pigtail has a length less than 40 centimeters.

4. The hybrid optical and electrical connection system of claim 1, wherein the connectorized pigtail has a length less than 30 centimeters.

5. The hybrid optical and electrical connection system of claim 1, wherein the closure has a length less than 10 centimeters.

6. The hybrid optical and electrical connection system of claim 1, wherein the closure includes a hinged cover.

7. The hybrid optical and electrical connection system of claim 1, wherein the closure includes first and second housing pieces that cooperate to define an interior region for housing optical splices and electrical connections.

8. The hybrid optical and electrical connection system of claim 7, wherein first and second housing pieces are connected by a hinge.

9. The hybrid optical and electrical connection system of claim 1, wherein the closure is environmentally sealed.

10. The hybrid optical and electrical connection system of claim 9, wherein the closure is environmentally sealed by a gel.

11. The hybrid optical and electrical connection system of claim 1, wherein the stub cable includes at least two optical fibers, wherein the hybrid optical and electrical connector includes a multi-fiber ferrule that supports end portions of the optical fibers, and wherein the hybrid optical and electrical connector includes at least two electrical contacts electrically connected to the electrical conductors of the stub cable.

12. The hybrid optical and electrical connection system of claim 11, wherein the electrical contacts include pins or sockets.

13. The hybrid optical and electrical connection system of claim 1, wherein the stub cable includes at least two optical fibers, wherein the hybrid optical and electrical connector includes at least two ferrules that support end portions of the optical fibers, and wherein the hybrid optical and electrical connector includes at least two electrical contacts electrically connected to the electrical conductors of the stub cable.

14. The hybrid optical and electrical connection system of claim 13, wherein the electrical contacts include pins or sockets.

15. The hybrid optical and electrical connection system of claim 1, further comprising a tapered, flexible boot positioned at a juncture between the closure and the field cable.

16. The hybrid optical and electrical connection system of claim 1, wherein the optical fiber of the stub cable is connected to an optical fiber of the field cable by a splice within the closure.

17. The hybrid optical and electrical connection system of claim 16, wherein the splice is a mechanical splice or a fusion splice.

18. The hybrid optical and electrical connection system of claim 1, further comprising electrical terminals within the closure for electrically connecting the electrical conductors of the stub cable to electrical conductors of the field cable.

19. The hybrid optical and electrical connection system of claim 1, wherein the electrical terminals include insulation displacement connector terminals.

20. The hybrid optical and electrical connection system of claim 1, wherein the electrical conductors of the stub cable are coupled to electrical conductors of the field cable at butt splices within the closure.

21. The hybrid optical and electrical connection system of claim 1, wherein the hybrid optical and electrical connector includes a twist-to-lock fastening element for coupling the hybrid optical and electrical connector to a corresponding connector or adapter.

22. The hybrid optical and electrical connection system of claim 21, wherein the twist-to-lock fastening element includes an internally threaded sleeve, an externally threaded nut or a bayonet-style coupling element.

23. The hybrid optical and electrical connection system of claim 1, wherein the hybrid optical and electrical connector is environmentally sealed when coupled to a corresponding connector or adapter.

24. The hybrid optical and electrical connection system of claim 1, wherein the closure accommodates only a single one of the stub cable.

25. The hybrid optical and electrical connection system of claim 1, wherein the field cable includes at least one optical fiber and at least two electrical conductors, wherein all of the optical fibers of the field cable are optically spliced to corresponding ones of the optical fibers of the stub cable within the closure and wherein all of the electrical conductors of the field cable are electrically connected to corresponding ones of the electrical conductors of the stub cable within the closure.

26. The hybrid optical and electrical connection system of claim 1, wherein a one-to-one ratio is provided at the closure for the optical and electrical connections between the field cable and the stub cable.

27. A hybrid optical and electrical connection system comprising;

a connectorized pigtail including:

a) a stub cable including a jacket containing at least one optical fiber and at least two electrical conductors, the stub cable having opposite first and second ends; and b) a hybrid optical and electrical connector that is factory terminated at the first end of the stub cable; and a closure that mounts at the second end of the stub cable for enclosing optical and electrical connections between the second end of the stub cable and a field cable;

wherein the field cable includes at least one optical fiber and at least two electrical conductors, wherein all of the optical fibers of the field cable are optically spliced to corresponding ones of the optical fibers of the stub cable within the closure and wherein all of the electrical conductors of the field cable are electrically connected to corresponding ones of the electrical conductors of the stub cable within the closure.

* * * * *